United States Patent
Cao et al.

(10) Patent No.: US 10,768,815 B1
(45) Date of Patent: *Sep. 8, 2020

(54) UPGRADING A STORAGE SYSTEM

(71) Applicant: Pure Storage, Inc., Mountain View, CA (US)

(72) Inventors: Jianting Cao, Sunnyvale, CA (US); Wentian Cui, Sunnyvale, CA (US); Christopher Golden, Emerald Hills, CA (US); David Grunwald, San Francisco, CA (US); Scott Smith, San Mateo, CA (US); Qi Zhou, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/965,769

(22) Filed: Apr. 27, 2018

Related U.S. Application Data

(63) Continuation of application No. 15/071,663, filed on Mar. 16, 2016, now Pat. No. 9,959,043.

(51) Int. Cl.
*G06F 3/06* (2006.01)
*G06F 8/656* (2018.01)

(52) U.S. Cl.
CPC ............ *G06F 3/0604* (2013.01); *G06F 3/067* (2013.01); *G06F 3/0607* (2013.01);
(Continued)

(58) Field of Classification Search
None
See application file for complete search history.

(56) References Cited

U.S. PATENT DOCUMENTS 5,359,730 A 10/1994 Marron
5,706,210 A 1/1998 Kumano et al.
(Continued)

FOREIGN PATENT DOCUMENTS

EP 0725324 A2 8/1996
EP 0738980 A2 10/1996
(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Denise Tran

(57) ABSTRACT

Performing a non-disruptive upgrade of data in a storage system that includes a plurality of storage devices and a storage controller, including: creating new data in a new data format, wherein the new data includes a reference to old data in an old data format, wherein system software in the storage system can utilize data in the new data format and the old data format; determining that a portion of the volume has changed; and responsive to determining that the portion of the volume has changed, updating the new data to include a reference to old data associated with a portion of the volume that precedes the changed portion of the volume, new data associated with the changed portion of the volume, and a reference to old data associated with a portion of the volume that follows the changed portion of the volume.

17 Claims, 8 Drawing Sheets

(52) U.S. Cl.
CPC .......... *G06F 3/0632* (2013.01); *G06F 3/0661* (2013.01); *G06F 3/0673* (2013.01); *G06F 8/656* (2018.02)

(56) References Cited

U.S. PATENT DOCUMENTS

| | | | |
|---|---|---|---|
| 5,799,200 | A | 8/1998 | Brant et al. |
| 5,933,598 | A | 8/1999 | Scales et al. |
| 6,012,032 | A | 1/2000 | Donovan et al. |
| 6,085,333 | A | 7/2000 | DeKoning et al. |
| 6,425,125 | B1* | 7/2002 | Fries .................. G06F 8/68 717/168 |
| 6,643,641 | B1 | 11/2003 | Snyder |
| 6,647,514 | B1 | 11/2003 | Umberger et al. |
| 6,789,162 | B1 | 9/2004 | Talagala et al. |
| 7,089,272 | B1 | 8/2006 | Garthwaite et al. |
| 7,107,389 | B2 | 9/2006 | Inagaki et al. |
| 7,146,521 | B1 | 12/2006 | Nguyen |
| 7,334,124 | B2 | 2/2008 | Pham et al. |
| 7,437,530 | B1 | 10/2008 | Rajan |
| 7,493,424 | B1 | 2/2009 | Bali et al. |
| 7,669,029 | B1 | 2/2010 | Mishra et al. |
| 7,689,609 | B2 | 3/2010 | Lango et al. |
| 7,743,191 | B1 | 6/2010 | Liao |
| 7,899,780 | B1 | 3/2011 | Shmuylovich et al. |
| 8,042,163 | B1 | 10/2011 | Karr et al. |
| 8,086,585 | B1 | 12/2011 | Brashers et al. |
| 8,200,887 | B2 | 6/2012 | Bennett |
| 8,271,700 | B1 | 9/2012 | Annem et al. |
| 8,387,136 | B2 | 2/2013 | Lee et al. |
| 8,437,189 | B1 | 5/2013 | Montierth et al. |
| 8,465,332 | B2 | 6/2013 | Hogan et al. |
| 8,527,544 | B1 | 9/2013 | Colgrove et al. |
| 8,566,546 | B1 | 10/2013 | Marshak et al. |
| 8,578,442 | B1 | 11/2013 | Banerjee |
| 8,613,066 | B1 | 12/2013 | Brezinski et al. |
| 8,620,970 | B2 | 12/2013 | English et al. |
| 8,751,463 | B1 | 6/2014 | Chamness |
| 8,762,642 | B2 | 6/2014 | Bates et al. |
| 8,769,622 | B2 | 7/2014 | Chang et al. |
| 8,800,009 | B1 | 8/2014 | Beda, III et al. |
| 8,812,860 | B1 | 8/2014 | Bray |
| 8,850,546 | B1 | 9/2014 | Field et al. |
| 8,898,346 | B1 | 11/2014 | Simmons |
| 8,909,854 | B2 | 12/2014 | Yamagishi et al. |
| 8,931,041 | B1 | 1/2015 | Banerjee |
| 8,949,863 | B1 | 2/2015 | Coatney et al. |
| 8,984,602 | B1 | 3/2015 | Bailey et al. |
| 8,990,905 | B1 | 3/2015 | Bailey et al. |
| 9,081,713 | B1 | 7/2015 | Bennett |
| 9,124,569 | B2 | 9/2015 | Hussain et al. |
| 9,134,922 | B2 | 9/2015 | Rajagopal et al. |
| 9,189,334 | B2 | 11/2015 | Bennett |
| 9,209,973 | B2 | 12/2015 | Aikas et al. |
| 9,250,823 | B1 | 2/2016 | Kamat et al. |
| 9,300,660 | B1 | 3/2016 | Borowiec et al. |
| 9,311,182 | B2 | 4/2016 | Bennett |
| 9,444,822 | B1 | 9/2016 | Borowiec et al. |
| 9,507,532 | B1 | 11/2016 | Colgrove et al. |
| 9,632,870 | B2 | 4/2017 | Bennett |
| 2002/0013802 | A1 | 1/2002 | Mori et al. |
| 2003/0145172 | A1 | 7/2003 | Galbraith et al. |
| 2003/0191783 | A1 | 10/2003 | Wolczko et al. |
| 2003/0225961 | A1 | 12/2003 | Chow et al. |
| 2004/0080985 | A1 | 4/2004 | Chang et al. |
| 2004/0111573 | A1 | 6/2004 | Garthwaite |
| 2004/0153844 | A1 | 8/2004 | Ghose et al. |
| 2004/0193814 | A1 | 9/2004 | Erickson et al. |
| 2004/0260967 | A1 | 12/2004 | Guha et al. |
| 2005/0160416 | A1 | 7/2005 | Jamison |
| 2005/0188246 | A1 | 8/2005 | Emberty et al. |
| 2005/0216800 | A1 | 9/2005 | Bicknell et al. |
| 2006/0015771 | A1 | 1/2006 | Van Gundy et al. |
| 2006/0129817 | A1 | 6/2006 | Borneman et al. |
| 2006/0161726 | A1 | 7/2006 | Lasser |
| 2006/0230245 | A1 | 10/2006 | Gounares et al. |
| 2006/0239075 | A1 | 10/2006 | Williams et al. |
| 2007/0022227 | A1 | 1/2007 | Miki |
| 2007/0028068 | A1 | 2/2007 | Golding et al. |
| 2007/0055702 | A1 | 3/2007 | Fridella et al. |
| 2007/0109856 | A1 | 5/2007 | Pellicone et al. |
| 2007/0150689 | A1 | 6/2007 | Pandit et al. |
| 2007/0168321 | A1 | 7/2007 | Saito et al. |
| 2007/0220227 | A1 | 9/2007 | Long |
| 2007/0294563 | A1 | 12/2007 | Bose |
| 2007/0294564 | A1 | 12/2007 | Reddin et al. |
| 2008/0005146 | A1 | 1/2008 | Kubo et al. |
| 2008/0005587 | A1 | 1/2008 | Ahlquist |
| 2008/0077825 | A1 | 3/2008 | Bello et al. |
| 2008/0082589 | A1* | 4/2008 | English ............ G06F 17/30076 |
| 2008/0162674 | A1 | 7/2008 | Dahiya |
| 2008/0195833 | A1 | 8/2008 | Park |
| 2008/0270678 | A1 | 10/2008 | Cornwell et al. |
| 2008/0282045 | A1 | 11/2008 | Biswas et al. |
| 2009/0077340 | A1 | 3/2009 | Johnson et al. |
| 2009/0100115 | A1 | 4/2009 | Park et al. |
| 2009/0198889 | A1 | 8/2009 | Ito et al. |
| 2010/0052625 | A1 | 3/2010 | Cagno et al. |
| 2010/0211723 | A1 | 8/2010 | Mukaida |
| 2010/0246266 | A1 | 9/2010 | Park et al. |
| 2010/0257142 | A1 | 10/2010 | Murphy et al. |
| 2010/0262764 | A1 | 10/2010 | Liu et al. |
| 2010/0325345 | A1 | 12/2010 | Ohno et al. |
| 2010/0332754 | A1 | 12/2010 | Lai et al. |
| 2011/0072290 | A1 | 3/2011 | Davis et al. |
| 2011/0125955 | A1 | 5/2011 | Chen |
| 2011/0131231 | A1 | 6/2011 | Haas et al. |
| 2011/0167221 | A1 | 7/2011 | Pangal et al. |
| 2012/0023144 | A1 | 1/2012 | Rub |
| 2012/0054264 | A1 | 3/2012 | Haugh et al. |
| 2012/0079318 | A1 | 3/2012 | Colgrove et al. |
| 2012/0131253 | A1 | 5/2012 | McKnight et al. |
| 2012/0303919 | A1 | 11/2012 | Hu et al. |
| 2012/0311000 | A1 | 12/2012 | Post et al. |
| 2013/0007845 | A1 | 1/2013 | Chang et al. |
| 2013/0031414 | A1 | 1/2013 | Dhuse et al. |
| 2013/0036272 | A1 | 2/2013 | Nelson |
| 2013/0071087 | A1 | 3/2013 | Motiwala et al. |
| 2013/0145447 | A1 | 6/2013 | Maron |
| 2013/0191555 | A1 | 7/2013 | Liu |
| 2013/0198459 | A1 | 8/2013 | Joshi et al. |
| 2013/0205173 | A1 | 8/2013 | Yoneda |
| 2013/0219164 | A1 | 8/2013 | Hamid |
| 2013/0227201 | A1 | 8/2013 | Talagala et al. |
| 2013/0290607 | A1 | 10/2013 | Chang et al. |
| 2013/0311434 | A1 | 11/2013 | Jones |
| 2013/0318297 | A1 | 11/2013 | Jibbe et al. |
| 2013/0332614 | A1 | 12/2013 | Brunk et al. |
| 2014/0020083 | A1 | 1/2014 | Fetik |
| 2014/0074850 | A1 | 3/2014 | Noel et al. |
| 2014/0082715 | A1 | 3/2014 | Grajek et al. |
| 2014/0086146 | A1 | 3/2014 | Kim et al. |
| 2014/0090009 | A1 | 3/2014 | Li et al. |
| 2014/0096220 | A1 | 4/2014 | Da Cruz Pinto et al. |
| 2014/0101434 | A1 | 4/2014 | Senthurpandi et al. |
| 2014/0164774 | A1 | 6/2014 | Nord et al. |
| 2014/0173232 | A1 | 6/2014 | Reohr et al. |
| 2014/0195636 | A1 | 7/2014 | Karve et al. |
| 2014/0201512 | A1 | 7/2014 | Seethaler et al. |
| 2014/0201541 | A1 | 7/2014 | Paul et al. |
| 2014/0208155 | A1 | 7/2014 | Pan |
| 2014/0215590 | A1 | 7/2014 | Brand |
| 2014/0229654 | A1 | 8/2014 | Goss et al. |
| 2014/0230017 | A1 | 8/2014 | Saib |
| 2014/0258526 | A1 | 9/2014 | Le Sant et al. |
| 2014/0282983 | A1 | 9/2014 | Ju et al. |
| 2014/0285917 | A1 | 9/2014 | Cudak et al. |
| 2014/0325262 | A1 | 10/2014 | Cooper et al. |
| 2014/0351627 | A1 | 11/2014 | Best et al. |
| 2014/0373104 | A1 | 12/2014 | Gaddam et al. |
| 2014/0373126 | A1 | 12/2014 | Hussain et al. |
| 2015/0026387 | A1 | 1/2015 | Sheredy et al. |
| 2015/0074463 | A1 | 3/2015 | Jacoby et al. |
| 2015/0089569 | A1 | 3/2015 | Sondhi et al. |

(56) References Cited

U.S. PATENT DOCUMENTS

| | | | |
|---|---|---|---|
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0149822 | A1 | 5/2015 | Coronado et al. |
| 2015/0193169 | A1 | 7/2015 | Sundaram et al. |
| 2015/0378888 | A1 | 12/2015 | Zhang et al. |
| 2016/0098323 | A1 | 4/2016 | Mutha et al. |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |
| 2017/0269838 | A1 | 9/2017 | Cao et al. |

FOREIGN PATENT DOCUMENTS

| | | | |
|---|---|---|---|
| EP | 3430506 | A1 | 1/2019 |
| WO | WO-2012/087648 | A1 | 6/2012 |
| WO | WO-2013071087 | A1 | 5/2013 |
| WO | WO-2014/110137 | A1 | 7/2014 |
| WO | WO-2016/015008 | A1 | 12/2016 |
| WO | WO-2016/190938 | A1 | 12/2016 |
| WO | WO-2016/195759 | A1 | 12/2016 |
| WO | WO-2016/195958 | A1 | 12/2016 |
| WO | WO-2016/195961 | A1 | 12/2016 |
| WO | WO-2017/160347 | A1 | 9/2017 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.
Google Search of "storage array define" performed by the Examiner on Nov. 4, 2015 for U.S. Appl. No. 14/725,278, Results limited to entries dated before 2012, 1 page.
Techopedia, *What is a disk array*, techopedia.com (online), Jan. 13, 2012, 1 page, URL: web.archive.org/web/20120113053358/http://www.techopedia.com/definition/1009/disk-array.
Webopedia, *What is a disk array*, webopedia.com (online), May 26, 2011, 2 pages, URL: web/archive.org/web/20110526081214/http://www.webopedia.com/TERM/D/disk_array.html.
Li et al., *Access Control for the Services Oriented Architecture*, Proceedings of the 2007 ACM Workshop on Secure Web Services (SWS '07), Nov. 2007, pp. 9-17, ACM New York, NY.
Hota et al., *Capability-based Cryptographic Data Access Control in Cloud Computing*, International Journal of Advanced Networking and Applications, col. 1, Issue 1, Aug. 2011, 10 pages, Eswar Publications, India.
Faith, *dictzip file format*, GitHub.com (online), accessed Jul. 28, 2015, 1 page, URL: github.com/fidlej/idzip.
Wikipedia, *Convergent Encryption*, Wikipedia.org (online), accessed Sep. 8, 2015, 2 pages, URL: en.wikipedia.org/wiki/Convergent_encryption.
Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.
ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-RELJ001_099/001/01.01.01_60/gs_NFV-REL001v010101p.pdf.
Microsoft, *Hybrid for SharePoint Server 2013—Security Reference Architecture*, Microsoft (online), Oct. 2014, 53 pages, URL: hybrid.office.com/img/Security_Reference_Architecture.pdf.
Microsoft, *Hybrid Identity*, Microsoft (online), Apr. 2014, 36 pages, URL: www.aka.ms/HybridIdentityWp.
Microsoft, *Hybrid Identity Management*, Microsoft (online), Apr. 2014, 17 pages, URL: download.microsoft.com/download/E/A/E/EAE57CD1-A80B-423C-96BB-142FAAC630139/Hybrid_Identity_Datasheet.pdf.
Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.
Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.
International Search Report and Written Opinion, PCT/US2016/015006, dated Jul. 18, 2016, 12 pages.
International Search Report and Written Opinion, PCT/US2016/015008, dated May 4, 2016, 12 pages.
International Search Report and Written Opinion, PCT/US2016/020410, dated Jul. 8, 2016, 12 pages.
International Search Report and Written Opinion, PCT/US2016/032084, dated Jul. 18, 2016, 12 pages.
International Search Report and Written Opinion, PCT/US2016/016333, dated Jun. 8, 2016, 12 pages.
International Search Report and Written Opinion, PCT/US2016/032052, dated Aug. 30, 2016, 17 pages.
International Search Report and Written Opinion, PCT/US2016/035492, dated Aug. 17, 2016, 10 pages.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.
International Search Report and Written Opinion, PCT/US2016/059758, dated Jan. 17, 2017, 12 pages.

\* cited by examiner

UPGRADING A STORAGE SYSTEM

CROSS-REFERENCE TO RELATED APPLICATION

This application is a continuation application of U.S. Pat. No. 9,959,043, issued May 1, 2018.

BACKGROUND

Technical Field

The field of the invention is data processing, or, more specifically, methods, apparatus, and products for performing a non-disruptive upgrade of data in a storage system that includes a plurality of storage devices and a storage controller.

Background Art

Modern storage systems may be used to store large amounts of data. Such data may occasionally need to be transformed into a different format in order to be utilized by software applications, especially when such software applications are updated. In such situations, an updated software application may typically be incapable of executing until the data transformation is complete, which may be a very time consuming process for storage systems that include very large amounts of data that must be transformed.

SUMMARY

Methods, apparatuses, and products for performing a non-disruptive upgrade of data in a storage system that includes a plurality of storage devices and a storage controller, including: creating new data in a new data format, wherein the new data includes a reference to old data in an old data format, wherein the new data and the old data are associated with a volume of data, and wherein system software in the storage system can utilize data in the new data format and the old data format; determining that a portion of the volume has changed; and responsive to determining that the portion of the volume has changed, updating the new data to include a reference to old data associated with a portion of the volume that precedes the changed portion of the volume, new data associated with the changed portion of the volume, wherein the new data associated with the changed portion of the volume is in the new data format, and a reference to old data associated with a portion of the volume that follows the changed portion of the volume.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
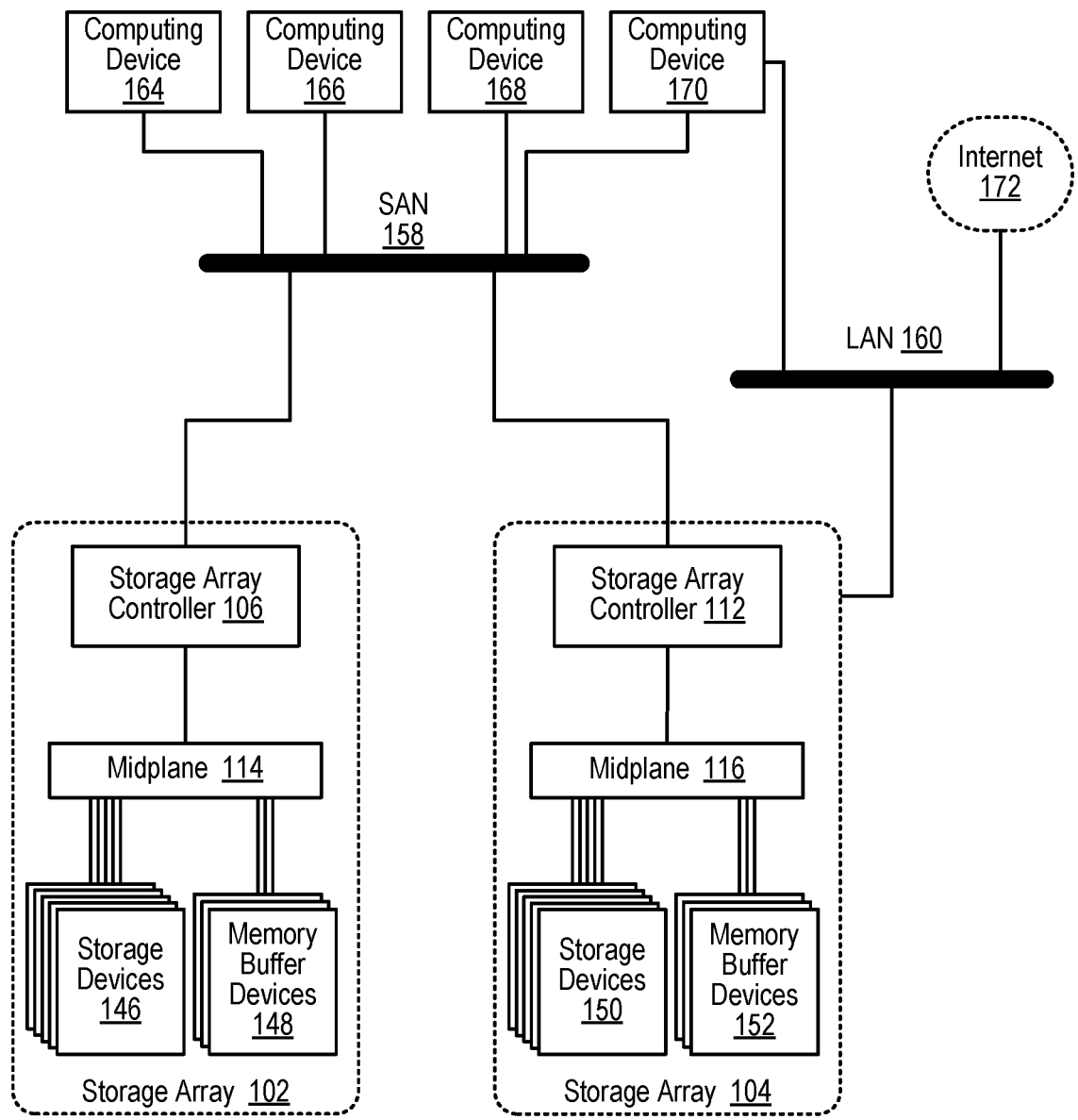
FIG. 1 sets forth a block diagram of a storage system configured for performing a non-disruptive upgrade of data according to embodiments of the present disclosure.

Example methods, apparatuses, and products for performing a non-disruptive upgrade of data in a storage system in accordance with the present disclosure are described with reference to the accompanying drawings, beginning with FIG. 1. FIG. 1 sets forth a block diagram of a storage system configured for performing a non-disruptive upgrade of data according to embodiments of the present disclosure. The storage system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system.

Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol (IF), HyperText Transfer Protocol ('EITTP'), Wireless Access Protocol ('WAP'), Handheld Device Transport Protocol ('HDTP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114, 116), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be useful in performing a non-disruptive upgrade of data in a storage system according to embodiments of the present disclosure. The storage array controllers (106, 112) may assist in performing a non-disruptive upgrade of data in a storage system by: creating new data in a new data format, where the new data includes a reference to old data in an old data format, wherein the new data and the old data are associated with a volume of data, and wherein system software in the storage system can utilize data in the new data format and the old data format; determining that a portion of the volume has changed; responsive to determining that the portion of the volume has changed, updating the new data to include: a reference to old data associated with a portion of the volume that precedes the changed portion of the volume; new data associated with the changed portion of the volume, wherein the new data associated with the changed portion of the volume is in the new data format; and a reference to old data associated with a portion of the volume that follows the changed portion of the volume, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Performing a non-disruptive upgrade of data in a storage system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in performing a non-disruptive upgrade of data in a storage system according to embodiments of the present disclosure.

Figure 2:
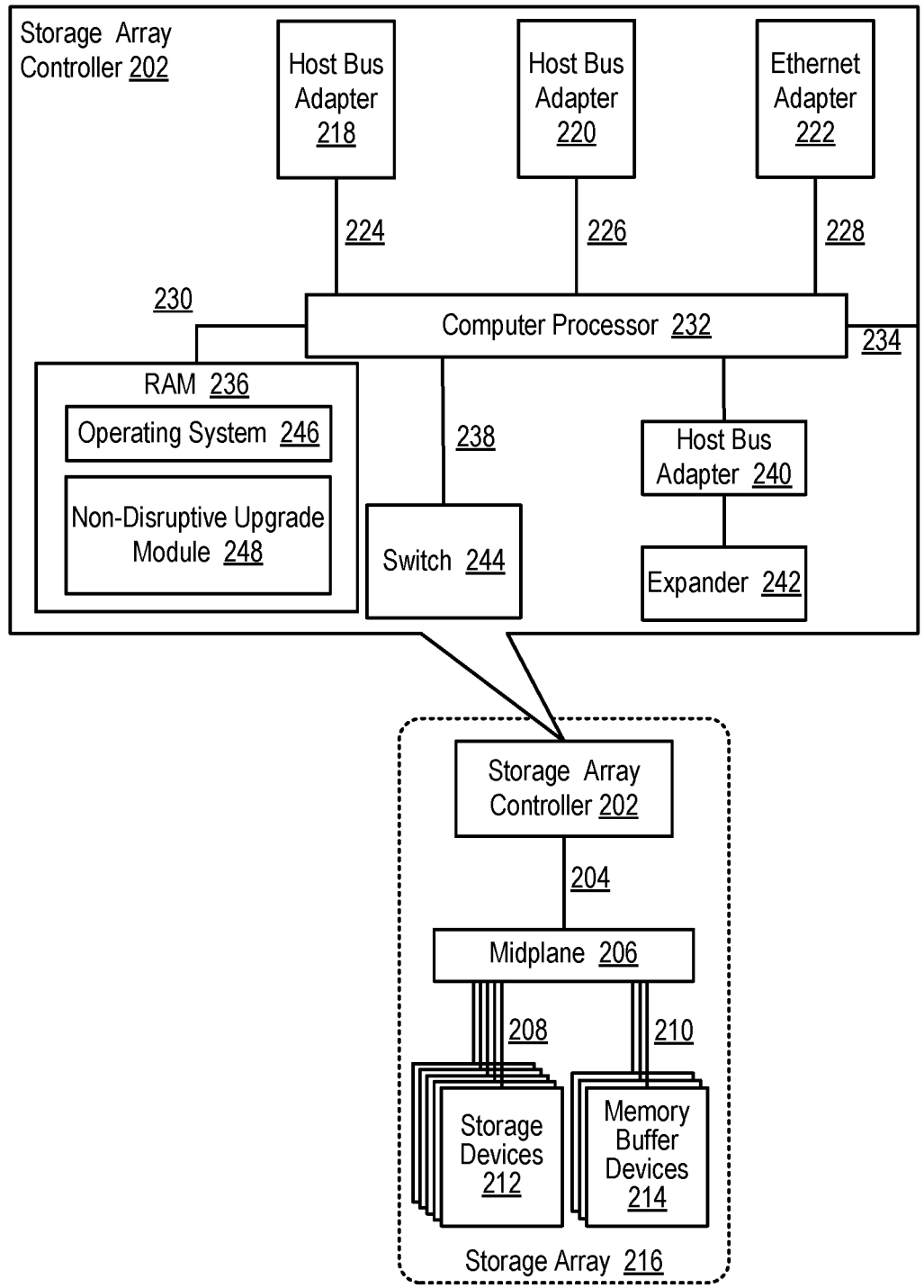
FIG. 2 sets forth a block diagram of a storage array controller (202) useful in performing a non-disruptive upgrade of data in a storage system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for intelligently compressing data in a storage array according to embodiments of the present disclosure include UNIX™, Linux, Microsoft Windows™, and others as will occur to those of skill in the art. Also stored in RAM (236) is a non-disruptive upgrade module (248), a module that includes computer program instructions useful in performing a non-disruptive upgrade of data in a storage system according to embodiments of the present disclosure.

The non-disruptive upgrade module (248) may perform a non-disruptive upgrade of data in a storage system by: creating new data in a new data format, wherein the new data includes a reference to old data in an old data format, wherein the new data and the old data are associated with a volume of data, and wherein system software in the storage system can utilize data in the new data format and the old data format; determining that a portion of the volume has changed; responsive to determining that the portion of the volume has changed, updating the new data to include: a reference to old data associated with a portion of the volume that precedes the changed portion of the volume; new data associated with the changed portion of the volume, wherein the new data associated with the changed portion of the volume is in the new data format; and a reference to old data associated with a portion of the volume that follows the changed portion of the volume, as will be described in greater detail below.

The non-disruptive upgrade module (248) may further perform a non-disruptive upgrade of data in a storage system by: updating system software in the storage system, wherein the updated system software utilizes metadata in the new data format and a previously installed version of the system software utilizes metadata in the old data format, wherein the new data includes metadata describing the volume of data; and the old data includes metadata describing the volume of data; replacing old data associated with the changed portion of the volume with a reference to the new data associated with the changed portion of the volume; executing, as a background process on the storage array controller, a data conversion process; updating the new data to include: a reference to old data associated with a portion of the volume that precedes the data-converted portion of the volume; new data associated with the data-converted portion of the volume, wherein the new data associated with the data-converted portion of the volume is in the new data format; and a reference to old data associated with a portion of the volume that follows the data-converted portion of the volume; replacing old data associated with the data-converted portion of the volume with a reference to the new data associated with the data-converted portion of the volume; copying a volume stored at a first location in the storage system; storing, at a second location within the storage system, the copy of the volume; copying metadata associated with the volume stored at the first location in the storage system, wherein the metadata associated with the volume stored at the first location in the storage system includes metadata in the new data format and metadata in the old data format; and storing, at a third location in the storage system, the metadata, wherein the metadata stored at the third location is associated with the copy of the volume stored at the second location within the storage system, as will be described in greater detail below.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
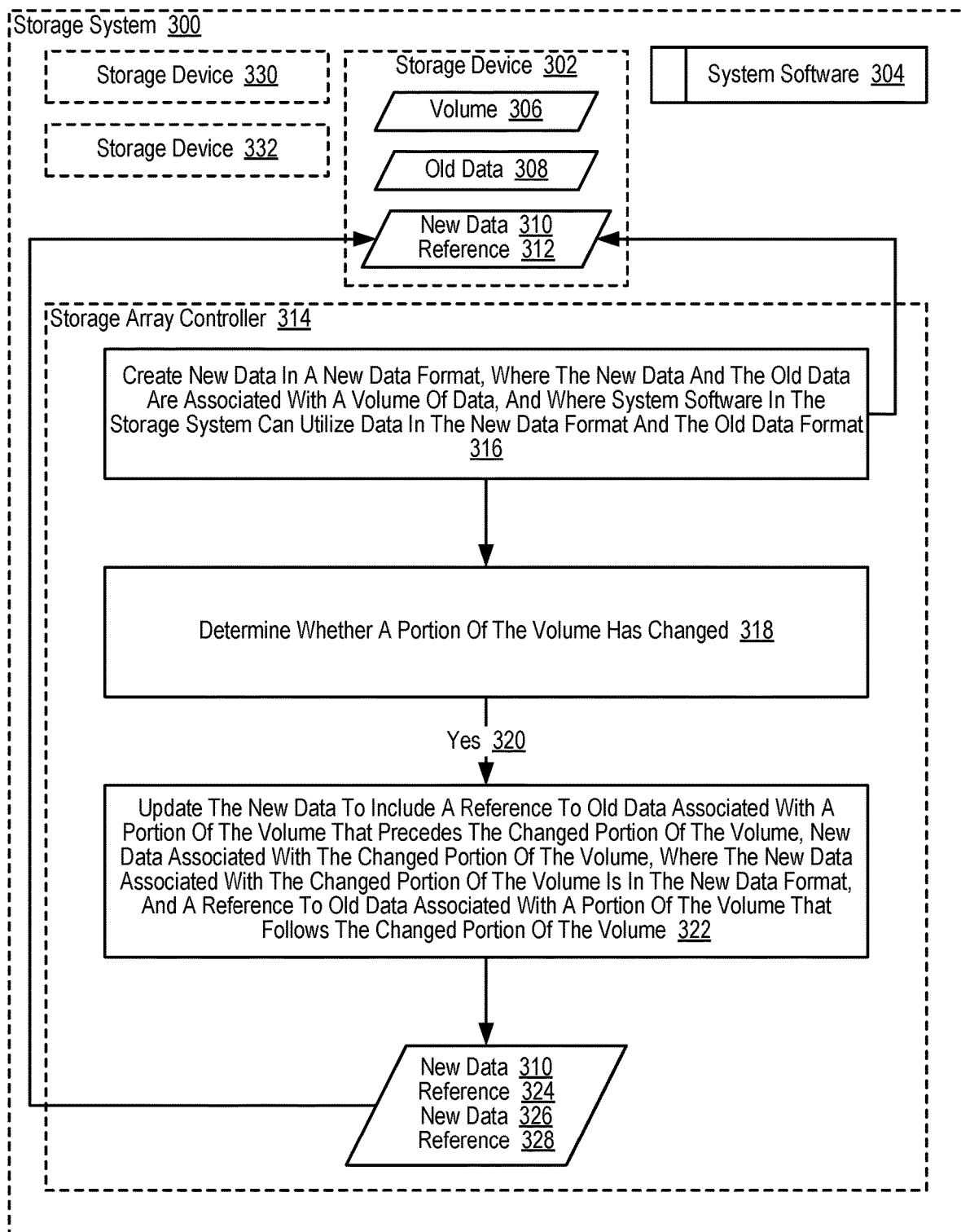
FIG. 3 sets forth a flow chart illustrating an example method for performing a non-disruptive upgrade of data in a storage system that includes a plurality of storage devices and a storage array controller according to embodiments of the present disclosure.

For further explanation, FIG. 3 sets forth a flow chart illustrating an example method for performing a non-disruptive upgrade of data in a storage system (300) that includes a plurality of storage devices (302, 330, 332) and a storage array controller (314) according to embodiments of the present disclosure. Although depicted in less detail, the storage system (300) of FIG. 3 may be similar to the storage arrays described above with reference to FIG. 1, as the storage system (300) may include one or more storage arrays. Likewise, the storage array controller (314) depicted in FIG. 3 may be similar to the storage array controller described above with reference to FIG. 2.

One of the storage devices (302) depicted in FIG. 3 includes a volume (306) of data. The volume (306) of data may be embodied as any logical collection of data such as, for example, a file, a file system, a database, data contained in a range of physical or logical addresses, one or more snapshots, and so on. The volume (306) of data may be associated with some other data such as, for example, metadata that describes the volume (306) of data. Entities within the storage system (300), such as system software (304) that executes within the storage system (300), may utilize the metadata to access or otherwise manage the volume (306) of data. In the example method depicted in FIG. 3, the metadata that is utilized by system software (304)

may be embodied as old data (308) that is stored on the storage device (302), where the old data (308) is in an old data format that is utilized by the system software (304).

In the example described above, however, entities such as the system software (304) may be upgraded occasionally, such that the system software (304) is upgraded to a newer or different version. Readers will appreciate that the upgraded version of the system software (304) may be configured to utilize metadata in a new data format. As such, the format of the metadata that describes the volume (306) of data may also need to be upgraded. By performing a non-disruptive upgrade of such data (i.e., the metadata), entities such as the system software (304) may be upgraded without requiring significant amounts of system downtime.

The example method depicted in FIG. 3 includes creating (316) new data (310) in a new data format. The new data (310) may be associated with the volume (306) and the new data format may represent, for example, a data format for metadata that is utilized by an updated version of the system software (304) to access or otherwise manage the volume (306). Creating (316) the new data (310) in a new data format may be carried out, for example, by creating an instance of a new data object and populating one or more fields of the new data object with information that is specific to the volume (306). Readers will appreciate that the new data (310) in the new data format may initially just be a stub that points back to the old data (308), which is also associated with the volume (306) and is formatted in the old data format.

In the example method depicted in FIG. 3, the new data (310) can include a reference (312) to old data (308) in the old data format. The reference (312) to the old data (308) in the old data format may be embodied, for example, as a pointer to the old data (308), as an address for the old data (308), and so on. In such an example, the new data format may therefore support the inclusion of pointers or forms of references (312) as elements within the new data (310).

The example method depicted in FIG. 3 also includes determining (318) whether a portion of the volume (306) of data has changed. A portion of the volume (306) may change, for example, when data is written to a portion of the volume (306), when physical memory whose contents are included in the volume (306) of data is erased, and so on. In such an example, determining (318) whether a portion of the volume (306) of data has changed may be carried out by identifying the range of physical or logical memory addresses that are used to store data that is included in the volume (306) and detecting that an instruction to modify the contents of memory within the range of physical or logical addresses that make up the volume (306) of data has been executed.

The example method depicted in FIG. 3 also includes updating (322) the new data (310) in response to affirmatively (320) determining that the portion of the volume (306) has changed. In the example method depicted in FIG. 3, updating (322) the new data (310) may be carried out by updating the new data (310) to include a reference (324) to old data (308) associated with a portion of the volume (306) that precedes the changed portion of the volume (306).

Consider an example in which the volume (306) of data includes all of the contents of memory within the storage device (302) that are addressed by address 0 to address 5000. In this example, assume that data was written to addresses 1600-1700. Given that data was written to addresses 1600-1700, the portion of the volume (306) that has changed would include the portion of the volume (306) whose contents reside in memory that is addressed by addresses 1600-1700. In such an example, the portion of the volume (306) that precedes the changed portion of the volume (306) would include the portion of the volume (306) whose contents reside in memory that is addressed by addresses 0-1599. As such, updating the new data (310) to include a reference (324) to old data (308) associated with a portion of the volume (306) that precedes the changed portion of the volume may be carried out by creating a reference (324) that points to the old data (308) that is associated with portion of the volume (306) whose contents reside in memory that is addressed by addresses 0-1599.

In the example method depicted in FIG. 3, updating (322) the new data (310) may be carried out by further updating the new data (310) to include new data (326) associated with the changed portion of the volume (306). In such an example, the new data (326) that is associated with the changed portion of the volume (306) can be in the new data format. Continuing with the example described above in which the volume (306) of data includes all of the contents of memory within the storage device (302) that are addressed by address 0-5000 and the portion of the volume (306) that has changed is the portion of the volume (306) whose contents are addressed by addresses 1600-1700, updating the new data (310) to include new data (326) associated with the changed portion of the volume (306) may be carried out by creating new data (326) that is associated with the portion of the volume (306) whose contents are addressed by addresses 1600-1700. For example, the new data (326) may be formatted in the new data format and may be embodied as metadata that enables an upgraded version of the system software (304) to access or otherwise manage the volume (306).

In the example method depicted in FIG. 3, updating (322) the new data (310) may be carried out by further updating the new data (310) to include a reference (328) to old data associated with a portion of the volume (306) that follows the changed portion of the volume (306). Continuing with the example described above in which the volume (306) of data includes all of the contents of memory within the storage device (302) that are addressed by addresses 0-5000 and the portion of the volume (306) that has changed is the portion of the volume (306) whose contents are addressed by addresses 1600-1700, updating the new data (310) to include a reference (328) to old data associated with a portion of the volume (306) that follows the changed portion of the volume (306) may be carried out by creating a reference (328) that points to the old data (308) that is associated with portion of the volume (306) whose contents are addressed by addresses 1701-5000.

Although the example method depicted in FIG. 3 illustrates a volume (306), old data (308), and new data (310) only residing in one of the storage devices (302), readers will appreciate that each additional storage device (330, 332) in the storage system (300) may also include one or more volumes of data, old data that is associated with one or more of the volumes, and new data (310) that is associated with one or more of the volumes. Readers will further appreciate that in some embodiments, volumes may be distributed across multiple storage devices and that the old data and new data that are associated with a particular volume need not be stored on the same storage device as the contents of the particular volume.

Readers will appreciate that in view of the fact that some data associated with the volume (306) may be in the old format and some other data associated with the volume (306) may be in the new format, the system software (306) may be configured to utilize data in the new data format and the old data format. For example, if the new data (310) and the old data (308) are embodied as metadata that enables the system software (304) to access the volume (306), the system software (304) may be configured to utilize both formats of metadata.

Figure 4:
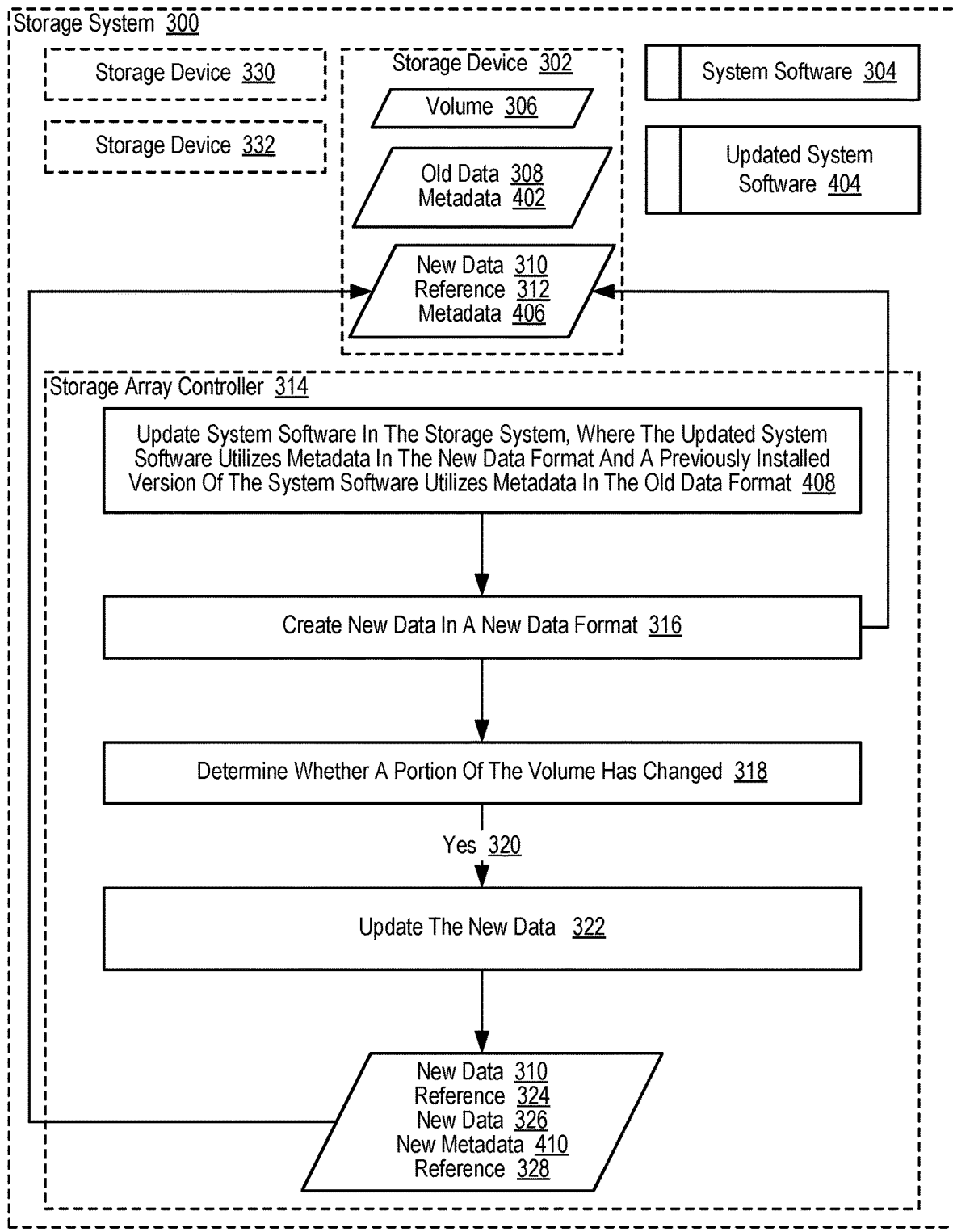
FIG. 4 sets forth a flow chart illustrating an additional example method for performing a non-disruptive upgrade of data in a storage system that includes a plurality of storage devices and a storage array controller according to embodiments of the present disclosure.

For further explanation, FIG. 4 sets forth a flow chart illustrating an additional example method for performing a non-disruptive upgrade of data in a storage system (300) that includes a plurality of storage devices (302, 330, 332) and a storage array controller (314) according to embodiments of the present disclosure. The example method depicted in FIG. 4 is similar to the example method depicted in FIG. 3, as the example method depicted in FIG. 4 also includes creating (316) new data (310) in a new data format, determining (318) whether a portion of the volume (306) of data has changed, and updating (322) the new data (310) in response to affirmatively (320) determining that the portion of the volume (306) has changed.

The example method depicted in FIG. 4 also includes updating (408) system software (304) in the storage system. Updating (408) the system software (304) in the storage system may be carried out, for example, by automatically updating the system software (304) in response to being notified that a newer version of the system software (304) is available, in response to a system administrator or other user causing an upgrade to occur, and so on.

In the example method depicted in FIG. 4, the updated system software (404) may utilize metadata in the new data format and a previously installed version of the system software (304) may utilize metadata (402) in the old data format. Although the updated system software (404) may utilize metadata in the new data format, the updated system software (404) may also be configured to be backwards compatible as the updated system software (404) may also utilize metadata (402) in the old data format. As such, when the new data (310) includes references (312, 324, 328) to metadata that is formatted utilizing the old data format, the updated system software (404) may still utilize metadata in one or more old data formats, until the metadata is updated to the new data format.

In the example method depicted in FIG. 4, the new data (310) includes metadata (406) describing the volume (306) of data and the old data (308) also includes metadata (402) describing the volume (306) of data. The new data (310) can include, for example, metadata (406) describing portions of the volume (306) that have changed while the old data (308) can include metadata (402) describing portions of the volume (306) that have not changed. When a particular portion of the volume (306) changes, the new data (310) may be updated (322) to include new metadata (410) that enables updated system software (404) to access or otherwise manage the particular portion of the volume (306) that has changed.

Figure 5:
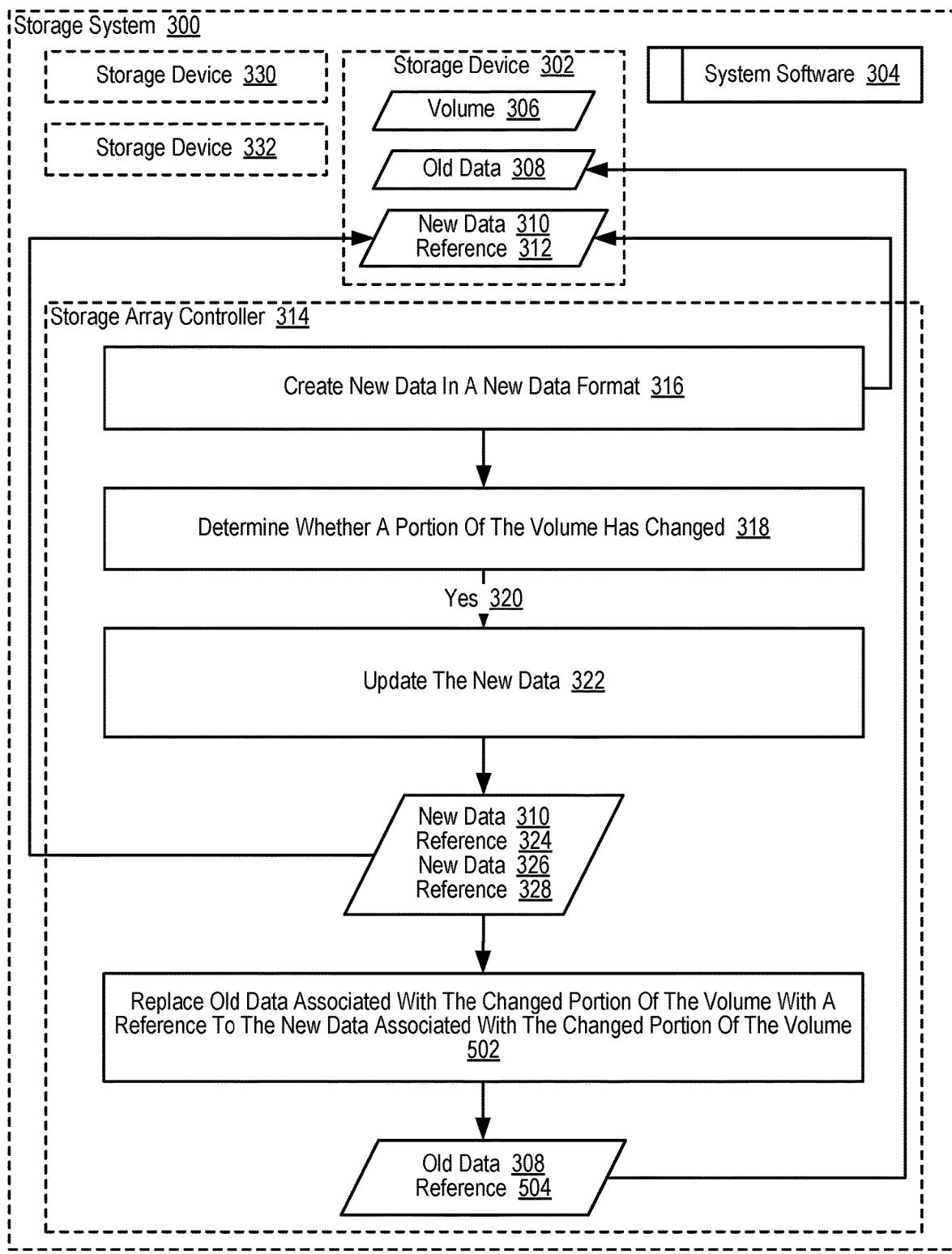
FIG. 5 sets forth a flow chart illustrating an additional example method for performing a non-disruptive upgrade of data in a storage system that includes a plurality of storage devices and a storage array controller according to embodiments of the present disclosure.

For further explanation, FIG. 5 sets forth a flow chart illustrating an additional example method for performing a non-disruptive upgrade of data in a storage system (300) that includes a plurality of storage devices (302, 330, 332) and a storage array controller (314) according to embodiments of the present disclosure. The example method depicted in FIG. 5 is similar to the example method depicted in FIG. 3, as the example method depicted in FIG. 5 also includes creating (316) new data (310) in a new data format, determining (318) whether a portion of the volume (306) of data has changed, and updating (322) the new data (310) in response to affirmatively (320) determining that the portion of the volume (306) has changed.

The example method depicted in FIG. 5 also includes replacing (502) old data (308) associated with the changed portion of the volume (306) with a reference (504) to the new data (326) associated with the changed portion of the volume (306). In the example method depicted in FIG. 5, replacing (502) old data (308) associated with the changed portion of the volume (306) with a reference (504) to the new data (326) associated with the changed portion of the volume (306) may be carried out by segmenting the old data (308) into three segments: a first segment that includes all of the old data (308) that is associated with the portion of the volume (306) that precedes the changed portion of the volume (306), a second segment that includes all of the old data (308) that is associated with the changed portion of the volume (306), and a third segment that includes all of the old data (308) that is associated with the portion of the volume (306) that follows the changed portion of the volume (306). Replacing (502) old data (308) that is associated with the changed portion of the volume (306) with a reference (504) to the new data (326) associated with the changed portion of the volume (306) may therefore be carried out, for example, by discarding the second segment of the old data (308) and replacing it with the reference (504) to the new data (326) that is associated with the changed portion of the volume (306). As such, the modified version of the old data (308) may include the first segment of the old data (308), the reference (504) to the new data (326) that is associated with the changed portion of the volume (306), and the third segment of the old data (308).

Readers will appreciate that because the old data (308) that is associated with the volume (306) may be retained, the storage array controller (314) may replace (502) old data (308) associated with the changed portion of the volume (306) with a reference (504) to the new data (326) that is associated with the changed portion of the volume (306) in order to reduce the size of the old data (308) that is retained. As additional portions of the volume (306) are changed, the old data (308) that is associated with the volume (306) may be whittled away and replaced with references to the new data (310).

Figure 6:
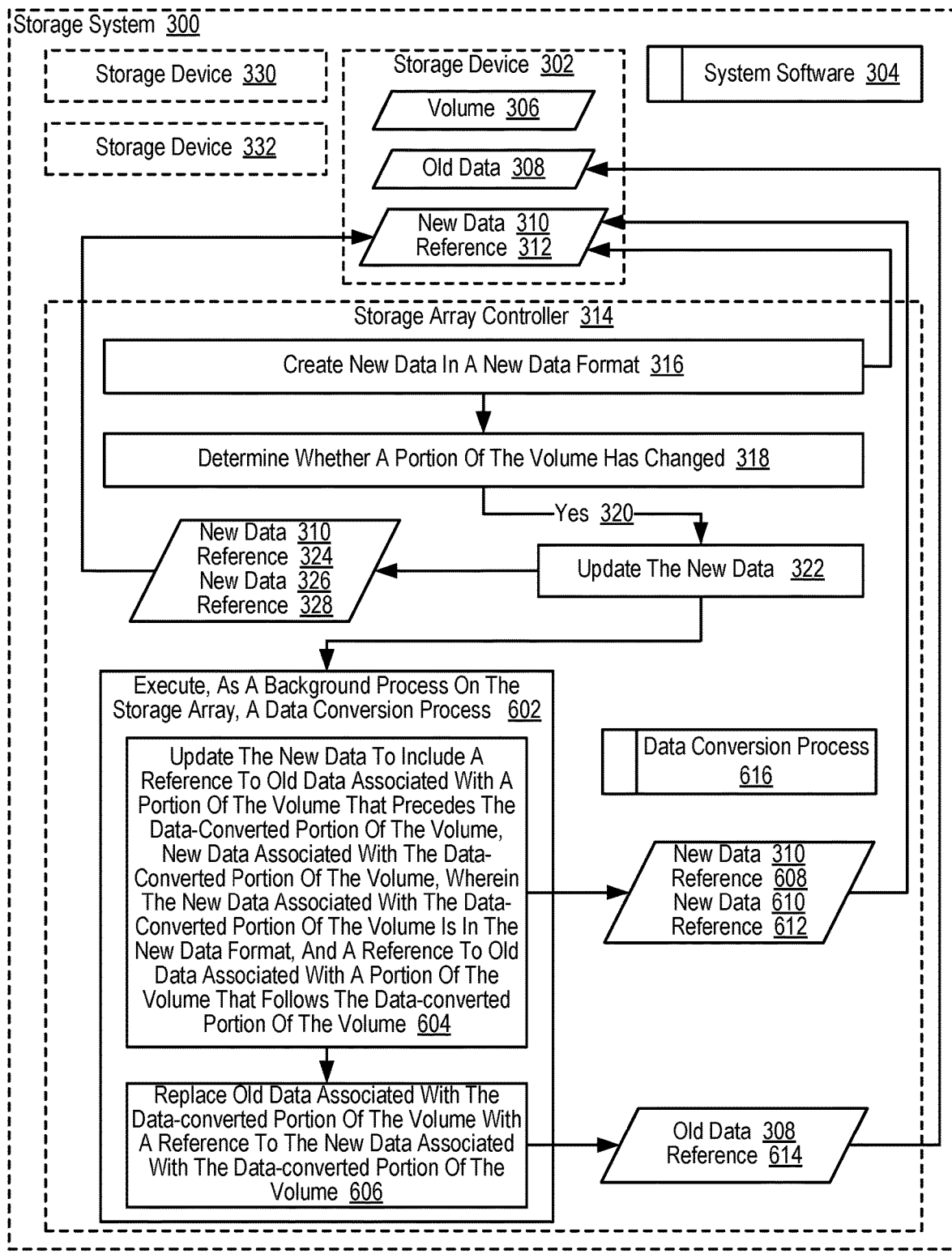
FIG. 6 sets forth a flow chart illustrating an additional example method for performing a non-disruptive upgrade of data in a storage system that includes a plurality of storage devices and a storage array controller according to embodiments of the present disclosure.

For further explanation, FIG. 6 sets forth a flow chart illustrating an additional example method for performing a non-disruptive upgrade of data in a storage system (300) that includes a plurality of storage devices (302, 330, 332) and a storage array controller (314) according to embodiments of the present disclosure. The example method depicted in FIG. 6 is similar to the example method depicted in FIG. 3, as the example method depicted in FIG. 6 also includes creating (316) new data (310) in a new data format, determining (318) whether a portion of the volume (306) of data has changed, and updating (322) the new data (310) in response to affirmatively (320) determining that the portion of the volume (306) has changed.

The example method depicted in FIG. 6 also includes executing (602), as a background process on the storage array controller (314), a data conversion process (616). The data conversion process (616) may be embodied, for example, as a module of computer program instructions executing on computer hardware such as a computer processor. The data conversion process (616) may be executed (602) as a background process, for example, by only executing the data conversion process (616) when system resource utilization falls below a threshold, by ceasing the execution of the data conversion process (616) when other processes require computing resources, and so on. The data conversion process (616) may be configured to convert old data (308) in the old data format into new data (310) in the new data format without requiring that any portion of the volume (306) changes. Readers will appreciate that the data conversion process (616) may therefore be utilized to convert data associated with volumes that never change, such as a volume that comprises a snapshot.

In the example method depicted in FIG. 6, executing (602) the data conversion process (616) further comprises updating (604) the new data (310) to include a reference (608) to old data (308) associated with a portion of the volume (306) that precedes a data-converted portion of the volume (306). Consider an example in which old data (308) associated with the volume (306) is stored within the storage device (302) at a location that is addressed by address 7000 to address 10000. In this example, assume that the portion of the old data (308) that resides at addresses 8000-9000 is converted into the new data format by the data conversion process. In such an example, the old data (308) associated with a portion of the volume (306) that precedes a data-converted portion of the volume (306) would include the old data (308) stored at addresses 7000-7999. As such, updating (604) the new data (310) to include a reference (608) to old data (308) associated with a portion of the volume (306) that precedes a data-converted portion of the volume (306) may be carried out by creating a reference (608) that points to the old data (308) that is stored at addresses 7000-7999.

In the example method depicted in FIG. 6, executing (602) the data conversion process (616) further comprises updating (604) the new data (310) to include new data (610) associated with the data-converted portion of the volume (306). In the example method depicted in FIG. 6, the new data (610) associated with the data-converted portion of the volume (306) may be in the new data format. Continuing with the example in which old data (308) associated with the volume (306) is stored within the storage device (302) at a location that is addressed by addresses 7000-10000 and the portion of the old data (308) that resides at addresses 8000-9000 has been converted into the new data format by the data conversion process (616), the new data (610) that is associated with the data-converted portion of the volume (306) will include the converted contents of addresses 8000-9000.

In the example method depicted in FIG. 6, executing (602) the data conversion process (616) further comprises updating (604) the new data (310) to include a reference (612) to old data (308) associated with a portion of the volume (306) that follows the data-converted portion of the volume (306). Continuing with an example in which old data (308) associated with the volume (306) is stored within the storage device (302) at addresses 7000-10000 and the old data (308) that resides at addresses 8000-9000 has been converted into the new data format by the data conversion process (616), the old data (308) that follows the data-converted portion of the volume (306) would include the old data (308) stored at addresses 9001-10000. As such, updating (604) the new data (310) to include a reference (612) to old data (308) associated with a portion of the volume (306) that follows the data-converted portion of the volume (306) may be carried out by creating a reference (612) that points to the old data (308) that is stored at addresses 9001-10000.

In the example method depicted in FIG. 6, executing (602) the data conversion process (616) further comprises replacing (606) old data (308) associated with the data-converted portion of the volume (306) with a reference to the new data (610) associated with the data-converted portion of the volume (306). Continuing with an example in which old data (308) associated with the volume (306) is stored within the storage device (302) at addresses 7000-10000 and the old data (308) that resides at addresses 8000-9000 has been converted into the new data format by the data conversion process (616), the old data (308) associated with the data-converted portion of the volume (306) would include the old data (308) stored at addresses 8000-9000. As such, replacing (606) old data (308) associated with the data-converted portion of the volume (306) with a reference (614) to the new data (610) associated with the data-converted portion of the volume (306) may be carried out by discarding the old data (308) stored at addresses 8000-9000 and creating a reference (614) to the new data (610) that is associated with the data-converted portion of the volume (306).

Figure 7:
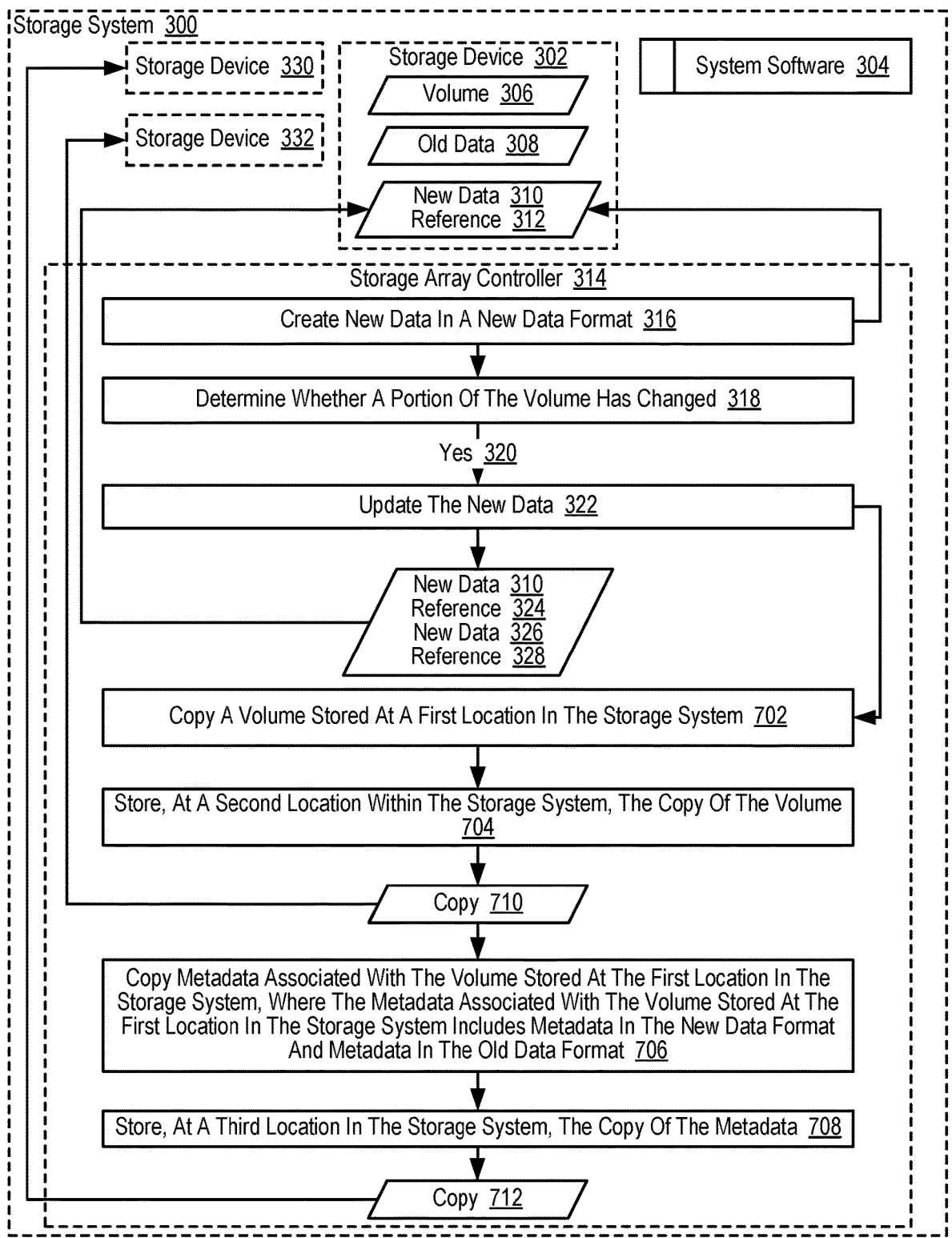
FIG. 7 sets forth a flow chart illustrating an additional example method for performing a non-disruptive upgrade of data in a storage system that includes a plurality of storage devices and a storage array controller according to embodiments of the present disclosure.

For further explanation, FIG. 7 sets forth a flow chart illustrating an additional example method for performing a non-disruptive upgrade of data in a storage system (300) that includes a plurality of storage devices (302, 330, 332) and a storage array controller (314) according to embodiments of the present disclosure. The example method depicted in FIG. 7 is similar to the example method depicted in FIG. 3, as the example method depicted in FIG. 7 also includes creating (316) new data (310) in a new data format, determining (318) whether a portion of the volume (306) of data has changed, and updating (322) the new data (310) in response to affirmatively (320) determining that the portion of the volume (306) has changed.

The example method depicted in FIG. 7 also includes copying (702) a volume (306) stored at a first location in the storage system (300). In the example method depicted in FIG. 7, the first location in the storage system (300) may be embodied as a particular storage device (302), an address within the particular storage device (302), and so on. Readers will appreciate that although FIG. 7 depicts an entire volume (306) being copied, in alternative embodiments, only a portion of the volume (306) may be copied (702).

The example method depicted in FIG. 7 also includes storing (704), at a second location within the storage system (300), the copy (710) of the volume (306). In the example method depicted in FIG. 7, the second location within the storage system (300) is depicted as being a different storage device (332) than the storage device (302) that houses the volume (306). Readers will appreciate that the depiction of the first location in the storage system (300) and the second location in the storage system (300) as being within different storage devices (302, 332) is only for illustrative purposes. In alternative embodiments, the first location in the storage system (300) and the second location in the storage system (300) may be different addresses in the same storage device. Likewise, the first location in the storage system (300) and the second location in the storage system (300) may be in different storage arrays in a multi-array storage system, different storage devices within the same storage array, and so on.

The example method depicted in FIG. 7 also includes copying (706) metadata associated with the volume (306) stored at the first location in the storage system (300). In the example method depicted in FIG. 7, the metadata associated with the volume (306) stored at the first location in the storage system (300) includes metadata in the new data format and metadata in the old data format. The metadata associated with the volume (306) may be embodied as the old data (308) that is stored in the same storage device (302) as the volume (306) and the new data (310) that is stored in the same storage device (302) as the volume (306). As such, copying (706) metadata associated with the volume (306) stored at the first location in the storage system (300) may be carried out by copying both the old data (308) and the new data (310).

The example method depicted in FIG. 7 also includes storing (708), at a third location in the storage system (300), a copy (712) of the metadata. Readers will appreciate that the depiction of the first location in the storage system (300), the second location in the storage system (300), and the third location within the storage system (300) as being within three different storage devices (302, 332, 334) is only for illustrative purposes. In alternative embodiments, each location may be embodied as different addresses in the same storage device, two of the locations may be embodied as different addresses in the same storage device, and so on. Likewise, each location may be in different storage arrays in a multi-array storage system, two of the locations may be in a first storage array while the other location is in a second storage array, each of the locations may be different storage devices within the same storage array, and so on.

In the example method depicted in FIG. 7, the copy (712) of the metadata stored at the third location is associated with the copy (710) of the volume stored at the second location within the storage system (300). The copy (712) of the metadata stored at the third location may be associated with the copy (710) of the volume stored at the second location within the storage system (300), for example, because the copy (712) of the metadata stored at the third location is metadata that is used to access or otherwise manage the copy (710) of the volume stored at the second location within the storage system (300).

Figure 8:
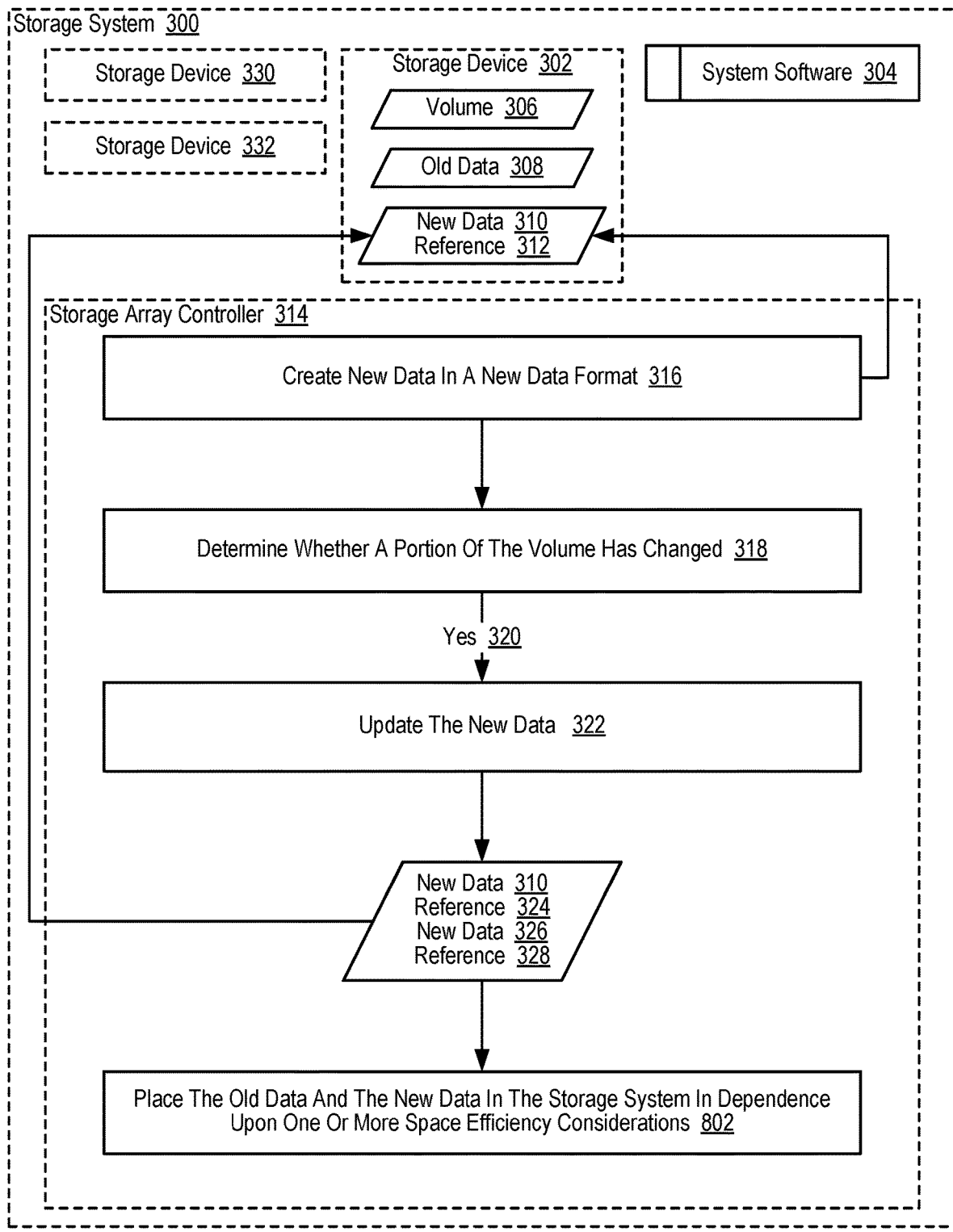
FIG. 8 sets forth a flow chart illustrating an additional example method for performing a non-disruptive upgrade of data in a storage system that includes a plurality of storage devices and a storage array controller according to embodiments of the present disclosure.

For further explanation, FIG. 8 sets forth a flow chart illustrating an additional example method for performing a non-disruptive upgrade of data in a storage system (300) that includes a plurality of storage devices (302, 330, 332) and a storage array controller (314) according to embodiments of the present disclosure. The example method depicted in FIG. 8 is similar to the example method depicted in FIG. 3, as the example method depicted in FIG. 8 also includes creating (316) new data (310) in a new data format, determining (318) whether a portion of the volume (306) of data has changed, and updating (322) the new data (310) in response to affirmatively (320) determining that the portion of the volume (306) has changed.

The example method depicted in FIG. 8 also includes placing (802) the old data (308) and the new data (310) in the storage system (300) in dependence upon one or more space efficiency considerations. The one or more space efficiency considerations may be embodied, for example, as a rule that is used to determine where to place (802) the old data (308) and the new data (310) in the storage system (300). Such a space efficiency consideration may specify, for example, that the old data (308) and the new data (310) are to be placed within a single memory region (e.g., a single storage device, a single storage array) where data within the memory region is deduplicated against other data in the memory region, as the old data (308) and the new data (310) may have similar data that can be effectively deduplicated. Alternatively, the old data (308) and the new data (310) that are associated with a particular volume (306) may be placed within a memory region where other volumes of similar types (e.g., other snapshots, other databases) are stored, as ability to deduplicate data may increase as data with similar characteristics are grouped together. Readers will appreciate that many other space efficiency considerations may exist and that the operations described above may therefore be carried out with an eye towards maximizing space efficiency.

The present invention may be embodied at least an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet (172), a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of upgrading a storage system that includes a plurality of storage devices and a storage controller, the method comprising:
    creating new data in a new data format, wherein the new data includes a reference to old data in an old data format, wherein the new data and the old data are associated with a volume of data, and wherein system software in the storage system can utilize data in the new data format and the old data format;
    determining that a portion of the volume has changed;
    responsive to determining that the portion of the volume has changed, updating the new data to include:
        a reference to old data associated with a portion of the volume that precedes the changed portion of the volume;
        new data associated with the changed portion of the volume, wherein the new data associated with the changed portion of the volume is in the new data format; and
        a reference to old data associated with a portion of the volume that follows the changed portion of the volume; and
    replacing old data associated with the changed portion of the volume with a reference to the new data associated with the changed portion of the volume.

2. The method of claim 1 further comprising executing, as a background process on the storage array controller, a data conversion process.

3. The method of claim 2 wherein executing the data conversion process further comprises:
    updating the new data to include: a reference to old data associated with a portion of the volume that precedes the data-converted portion of the volume; new data associated with the data-converted portion of the volume, wherein the new data associated with the data-converted portion of the volume is in the new data format; and a reference to old data associated with a portion of the volume that follows the data-converted portion of the volume,
    wherein old data associated with the data-converted portion of the volume is replaced with a reference to the new data associated with the data-converted portion of the volume.

4. The method of claim 1 further comprising:
    storing, at a second location within the storage system, a copy of a volume stored at a first location in the storage system.

5. The method of claim 4 further comprising:
    storing, at a third location in the storage system, metadata associated with the volume stored at the first location in the storage system, wherein the metadata associated with the volume stored at the first location in the storage system includes metadata in the new data format and metadata in the old data format, and wherein the metadata stored at the third location is associated with the copy of the volume stored at the second location within the storage system.

6. The method of claim 1 further comprising placing the old data and the new data in the storage system in dependence upon one or more space efficiency considerations.

7. An apparatus for upgrading a storage system that includes a plurality of storage devices, the apparatus comprising a computer processor, a computer memory operatively coupled to the computer processor, the computer memory having disposed within it computer program instructions that, when executed by the computer processor, cause the apparatus to carry out the steps of:
  creating new data in a new data format, wherein the new data includes a reference to old data in an old data format, wherein the new data and the old data are associated with a volume of data, and wherein system software in the storage system can utilize data in the new data format and the old data format;
  determining that a portion of the volume has changed;
  responsive to determining that the portion of the volume has changed, updating the new data to include:
  a reference to old data associated with a portion of the volume that precedes the changed portion of the volume;
  new data associated with the changed portion of the volume, wherein the new data associated with the changed portion of the volume is in the new data format; and
  a reference to old data associated with a portion of the volume that follows the changed portion of the volume; and
  replacing old data associated with the changed portion of the volume with a reference to the new data associated with the changed portion of the volume.

8. The apparatus of claim 7 further comprising computer program instructions that, when executed by the computer processor, cause the apparatus to carry out the step of executing, as a background process on the storage array controller, a data conversion process.

9. The apparatus of claim 8 wherein executing the data conversion process further comprises:
  updating the new data to include: a reference to old data associated with a portion of the volume that precedes the data-converted portion of the volume; new data associated with the data-converted portion of the volume, wherein the new data associated with the data-converted portion of the volume is in the new data format; and a reference to old data associated with a portion of the volume that follows the data-converted portion of the volume,
  wherein old data associated with the data-converted portion of the volume is replaced with a reference to the new data associated with the data-converted portion of the volume.

10. The apparatus of claim 7 further comprising computer program instructions that, when executed by the computer processor, cause the apparatus to carry out the steps of:
  storing, at a second location within the storage system, a copy of a volume stored at a first location in the storage system.

11. The apparatus of claim 10 wherein executing the data conversion process further comprises:
  storing, at a third location in the storage system, metadata associated with the volume stored at the first location in the storage system, wherein the metadata associated with the volume stored at the first location in the storage system includes metadata in the new data format and metadata in the old data format, and wherein the metadata stored at the third location is associated with the copy of the volume stored at the second location within the storage system.

12. The apparatus of claim 7 further comprising computer program instructions that, when executed by the computer processor, cause the apparatus to carry out the step of placing the old data and the new data in the storage system in dependence upon one or more space efficiency considerations.

13. A computer program product for upgrading a storage system that includes a plurality of storage devices and a storage controller, the computer program product disposed upon a non-transitory computer readable medium, the computer program product comprising computer program instructions that, when executed, cause a computer to carry out the steps of:
  creating new data in a new data format, wherein the new data includes a reference to old data in an old data format, wherein the new data and the old data are associated with a volume of data, and wherein system software in the storage system can utilize data in the new data format and the old data format;
  determining that a portion of the volume has changed;
  responsive to determining that the portion of the volume has changed, updating the new data to include:
  a reference to old data associated with a portion of the volume that precedes the changed portion of the volume;
  new data associated with the changed portion of the volume, wherein the new data associated with the changed portion of the volume is in the new data format; and
  a reference to old data associated with a portion of the volume that follows the changed portion of the volume; and
  replacing old data associated with the changed portion of the volume with a reference to the new data associated with the changed portion of the volume.

14. The computer program product of claim 13 further comprising computer program instructions that, when executed, cause a computer to carry out the step of executing, as a background process on the storage array controller, a data conversion process.

15. The computer program product of claim 14 wherein executing the data conversion process further comprises:
  updating the new data to include: a reference to old data associated with a portion of the volume that precedes the data-converted portion of the volume; new data associated with the data-converted portion of the volume, wherein the new data associated with the data-converted portion of the volume is in the new data format; and a reference to old data associated with a portion of the volume that follows the data-converted portion of the volume,
  wherein old data associated with the data-converted portion of the volume is replaced with a reference to the new data associated with the data-converted portion of the volume.

16. The computer program product of claim 13 further comprising computer program instructions that, when executed, cause a computer to carry out the steps of:
  storing, at a second location within the storage system, a copy of a volume stored at a first location in the storage system.

17. The computer program product of claim 16 further comprising computer program instructions that, when executed, cause a computer to carry out the steps of:
  storing, at a third location in the storage system, metadata associated with the volume stored at the first location in the storage system, wherein the metadata associated with the volume stored at the first location in the storage system includes metadata in the new data format and metadata in the old data format, and wherein the metadata stored at the third location is associated with the copy of the volume stored at the second location within the storage system.

* * * * *